US012644224B2

(12) United States Patent
Hu et al.

(10) Patent No.: US 12,644,224 B2
(45) Date of Patent: Jun. 2, 2026

(54) INTERNALLY EMULISIFIED POLYURETHANE DISPERSION AND METHOD FOR PREPARING THE SAME

(71) Applicant: Dow Global Technologies LLC, Midland, MI (US)

(72) Inventors: Xiaolian Hu, Shanghai (CN); Chao Zhang, Shanghai (CN); Biao Ma, Shanghai (CN); Nan Wang, Shanghai (CN); Yanli Feng, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 279 days.

(21) Appl. No.: 18/252,062

(22) PCT Filed: Jan. 18, 2021

(86) PCT No.: PCT/CN2021/072366

§ 371 (c)(1),
(2) Date: May 8, 2023

(87) PCT Pub. No.: WO2022/151459

PCT Pub. Date: Jul. 21, 2022

(65) Prior Publication Data

US 2024/0003079 A1 Jan. 4, 2024

(51) Int. Cl.

| | |
|---|---|
| ***D06N 3/14*** | (2006.01) |
| ***C08G 18/12*** | (2006.01) |
| ***C08G 18/32*** | (2006.01) |
| ***C08G 18/61*** | (2006.01) |
| ***C08G 18/65*** | (2006.01) |
| ***C08J 5/18*** | (2006.01) |
| ***D06N 3/00*** | (2006.01) |

(52) U.S. Cl.

CPC ............ *D06N 3/145* (2013.01); *C08G 18/12* (2013.01); *C08G 18/3228* (2013.01); *C08G 18/61* (2013.01); *C08G 18/6529* (2013.01); *C08J 5/18* (2013.01); *D06N 3/0011* (2013.01); *D06N 3/0047* (2013.01); *D06N 3/0059* (2013.01); *D06N 3/0065* (2013.01); *D06N 3/0097* (2013.01); *D06N 3/147* (2013.01); *C08J 2375/12* (2013.01); *D06N 2203/068* (2013.01); *D06N 2205/045* (2013.01); *D06N 2209/103* (2013.01); *D06N 2209/108* (2013.01)

(58) Field of Classification Search

None

See application file for complete search history.

(56) References Cited

U.S. PATENT DOCUMENTS

| | | | | |
|---|---|---|---|---|
| 6,524,564 | B1 | 2/2003 | Kim et al. | |
| 2008/0274361 | A1* | 11/2008 | Casteren Van ..... | C08G 18/7607 524/502 |
| 2017/0267805 | A1* | 9/2017 | Hatanaka ............... | D04H 1/435 |

FOREIGN PATENT DOCUMENTS

| | | |
|---|---|---|
| CN | 101307181 | 11/2008 |
| CN | 102167795 | 8/2011 |
| CN | 102206410 | 10/2011 |
| CN | 104962192 | 10/2015 |
| CN | 104031225 | 11/2016 |
| CN | 106632964 | 5/2017 |
| CN | 106947048 | 7/2017 |
| CN | 107722236 | 2/2018 |
| CN | 110862761 | 3/2020 |
| EP | 78597 | 5/1983 |
| WO | 2020177276 | 9/2020 |
| WO | 2020186377 | 9/2020 |

OTHER PUBLICATIONS

Xiameter OFX 7700 Datasheet Dec. 6, 2010 (Year: 2010).*
(Jeffamine D-400) retrieved on: Oct. 24, 2025, from: https://www.irochemical.com/product-detail/d-400/). (Year: 2025).*
PCT/CN2021/072366 International Search Report and Written Opinion with a mailing date of Jul. 12, 2021.

* cited by examiner

*Primary Examiner* — Robert S Jones, Jr.
*Assistant Examiner* — Lily K Sloan

(57) ABSTRACT

An internally emulsified polyurethane dispersion, which is prepared by using a combined chain extender system of a hydrophilic amino siloxane compound and a polyetheramine compound, is provided. The internally emulsified polyurethane dispersion can be used to prepare a synthetic leather product having good anti-stickiness, wrinkle resistance, color fastness and superior mechanical properties. A laminated synthetic leather article prepared with said internally emulsified polyurethane dispersion as well a method for preparing the synthetic leather article are also provided.

9 Claims, 1 Drawing Sheet

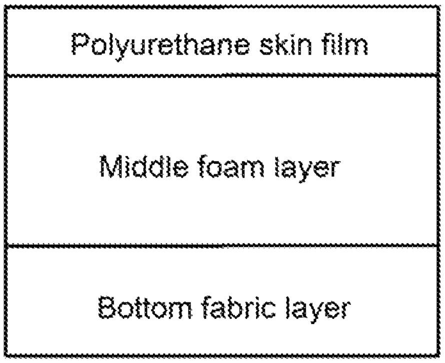
Polyurethane skin film
Middle foam layer
Bottom fabric layer

INTERNALLY EMULISIFIED POLYURETHANE DISPERSION AND METHOD FOR PREPARING THE SAME

FIELD OF THE INVENTION

The present disclosure relates to an internally emulsified polyurethane dispersion (PUD), a method for preparing the dispersion, and a laminated synthetic leather article comprising a skin film derived from the polyurethane dispersion. The laminated synthetic leather article prepared by said polyurethane dispersion exhibits superior anti-stickiness, wrinkle resistance, color fastness and mechanical properties.

TECHINICAL BACKGROUND

Synthetic leather gets popular applications in people's daily life, from clothes, footwear, bag and luggage, home upholstery to seats in automobile. It provides similar performance and hand feeling to natural leather with much better cost advantage. The synthetic leather is usually comprised of a top skin layer, a middle foam layer and a bottom fabric layer, and can be fabricated by coating polymer(s) on the middle foam layer and the bottom fabric layer, wherein the most commonly used polymer is polyurethane. Traditional processes are performed with the dispersion of polyurethane resin(s) in volatile organic solvents such as dimethylformamide (DMF), methylethyl ketone (MEK) and toluene, and such a dispersion is known as solvent-borne PU dispersion. However, the volatile organic solvents are very hazardous to plant operators, consumers and environment. Therefore, synthetic leather industry is pushed to solvent free fabrication process, to minimize the use of volatile organic solvents in the manufacturing of PU synthetic leather.

Some waterborne polyurethane dispersions (PUD's) have been reported as a green alternative to solvent-borne PU dispersion, but none of these waterborne polyurethane dispersions can produce a PU skin layer exhibiting a combination of various industrial CTQ's (Critical-To-Quality) including superior wrinkle resistance, anti-stickiness, abrasion resistance, softness, color fastness, hand feeling and mechanical properties. Actually, all the existing waterborne polyurethane dispersion has to trade off at least one performance property against other performance properties so as to produce a "less undesirable" synthetic leather product. Besides, the existing waterborne polyurethane dispersion can only be effectively used with a low solid content of, e.g. 45 wt. % or less, which will result in a skin layer having inferior surface appearance. There is still an urgent request for a unique waterborne polyurethane dispersion which can overcome all the shortcomings as stated above.

After persistent exploration, we have developed an internally emulsified PUD by using a combined chain extender system which can solve the above said performance trade-off in synthetic leather, that is, having high solid content, achieving good wrinkle resistance, good anti-stickiness and good color fastness while maintaining good hand-feeling (or relatively low modulus) and other good mechanical properties.

SUMMARY OF THE INVENTION

The present disclosure provides a unique waterborne polyurethane dispersion and a laminated synthetic leather article prepared by using the same.

In a first aspect of the present disclosure, the present disclosure provides an internally emulsified polyurethane dispersion comprising polyurethane particles dispersed in water, wherein the polyurethane dispersion is derived from starting materials comprising:

Component (A): one or more compounds having at least two isocyanate groups;

Component (B): one or more compounds having at least two isocyanate-reactive groups;

Component (C): a hydrophilic amino siloxane compound represented by Formula I:

Formula I

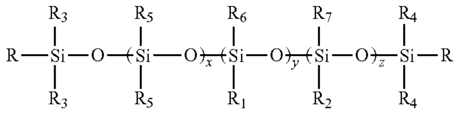

wherein each R independently represents methyl, ethyl, n-propyl, i-propyl, n-butyl, i-butyl, sec-butyl, t-butyl, n-pentyl, i-pentyl, tert-pentyl, neo-pentyl, cyclohexyl, phenyl, tolyl, vinyl, allyl or $—(OCH_2CH_2)_a—O—CH_2—CH═CH_2$;

$R_1$ is $—(CH_2)_mNH_2$ or $—(CH_2)_s—NH—(CH_2)_tNH_2$;

$R_2$ is $—CH_2CH_2CH_2O(CH_2CH_2O)_nH$; and each of $R_3$, $R_4$, $R_5$, $R_6$ and $R_7$ is independently selected from the group consisting of methyl, ethyl, n-propyl, i-propyl, n-butyl, i-butyl, sec-butyl, t-butyl, n-pentyl, i-pentyl, tert-pentyl neo-pentyl, cyclohexyl, phenyl and tolyl;

wherein a is an integer of 1 to 10; x is an integer of 20-500; y is an integer of 1-20; z is an integer of 1-20; m is an integer of 1-10; s is an integer of 1-10; t is an integer of 1-10; and n is an integer of 5-30;

Component (D): a polyetheramine compound represented by Formula II:

Formula II

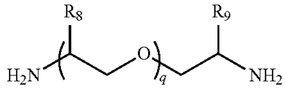

wherein each of $R_8$ and $R_9$ is independently selected from the group consisting of hydrogen, methyl, ethyl, n-propyl, i-propyl, n-butyl, i-butyl, sec-butyl, t-butyl, n-pentyl, i-pentyl, tert-pentyl, neo-pentyl, cyclohexyl, phenyl, tolyol, and combinations thereof, and q is an integer of 2 to 20;

Component (E): a $C_2$-$C_{20}$ carboxylic acid compound having at least two hydroxyl groups;

Component (F) a catalyst;

Component (G) a neutralizer; and

Component (H) water.

According to an embodiment of the present disclosure, the internally emulsified polyurethane dispersion is waterborne.

According to another embodiment of the present disclosure, the polyurethane dispersion does not comprise external emulsifier.

According to another embodiment of the present disclosure, the polyurethane dispersion has a solid content higher than 45% by weight, or higher than 48% by weight, or at least 50% by weight, based on the total weight of the polyurethane dispersion.

According to another embodiment of the present disclosure, the one or more compounds having at least two isocyanate groups of component (A) are selected from the group consisting of:

a) C4-C12 aliphatic polyisocyanates comprising at least two isocyanate groups, C6-C15 cycloaliphatic or aromatic polyisocyanates comprising at least two isocyanate groups, C7-C15 araliphatic polyisocyanates comprising at least two isocyanate groups, and a combination thereof;

b) modified multifunctional isocyanates derived from one or more polyisocyanates of a), wherein the modified multifunctional isocyanates comprises at least one functional group selected from the group consisting of ester group, urea group, biuret group, isocyanurate group, allophanate group, carbodiimide group, uretoneimine group, and a combination thereof; and c) an isocyanate prepolymer prepared by reacting one or more polyisocyanates of a) with one or more isocyanate-reactive compounds selected from the group consisting of C2-C16 aliphatic polyhydric alcohols comprising at least two hydroxyl groups, C6-C15 cycloaliphatic or aromatic polyhydric alcohols comprising at least two hydroxyl groups, C7-C15 araliphatic polyhydric alcohols comprising at least two hydroxyl groups, polyester polyols having a molecular weight from 500 to 5,000, polycarbonate diols having a molecular weight from 200 to 5,000, polyetherdiols having a molecular weight from 200 to 5,000, C2 to C10 polyamine comprising at least two amino groups, C2 to C10 polythiol comprising at least two thiol groups, C2-C10 alkanolamine comprising at least one hydroxyl group and at least one amino groups, and a combination thereof, with the proviso that the isocyanate prepolymer comprises at least two free isocyanate terminal groups.

According to another embodiment of the present disclosure, the one or more compounds having at least two isocyanate-reactive groups of component (B) are selected from the group consisting of: C2-C16 aliphatic polyhydric alcohols comprising at least two hydroxyl groups, C6-C15 cycloaliphatic or aromatic polyhydric alcohols comprising at least two hydroxyl groups, C7-C15 araliphatic polyhydric alcohols comprising at least two hydroxyl groups, polyester polyols having a molecular weight from 500 to 5,000, polycarbonate diols having a molecular weight from 200 to 5,000, polyether polyols having a molecular weight from 200 to 5,000, C2 to C10 polyamine comprising at least two amino groups, C2 to C10 polythiol comprising at least two thiol groups, C2-C10 alkanolamine comprising at least one hydroxyl group and at least one amino groups, vegetable oil having at least two hydroxyl groups, and a combination thereof.

According to another embodiment of the present disclosure, the $C_2$-$C_{20}$ carboxylic acid compound having at least two hydroxyl groups of component (E) is selected from the group consisting of dimethylol-formic acid, dimethylol-acetic acid, dimethylol-propionic acid, dimethylol-butanoic acid, dimethylol-pentanoic acid, dimethylol-hexanoic acid, dimethylol-heptanoic acid, dimethylol-nonanoic acid, dimethylol-capric acid, dimethylol-lauric acid, dimethylol-palmitic acid, dimethylol-stearic acid, dimethylol-cyclohexane carboxylic acid, dimethylol-benzoic acid, and any combinations thereof.

According to another embodiment of the present disclosure, the catalyst of component (F) is selected from the group consisting of: organic tin, organic bismuth, tertiary amine, morpholine derivative, piperazine derivative, and combination thereof.

According to another embodiment of the present disclosure, the content of component (A) is from 5 to 50% by weight, based on the total weight of the components (A), (B), (E) and (F). According to another embodiment of the present disclosure, the content of component (B) is from 25 to 85% by weight, based on the total weight of the components based on the total weight of the components (A), (B), (E) and (F). According to another embodiment of the present disclosure, the content of component (E) is from 1 to 10% by weight, based on the total weight of the components (A), (B), (E) and (F). According to another embodiment of the present disclosure, the content of component (F) is up to 1% by weight, based on the total weight of the components (A), (B), (E) and (F). According to another embodiment of the present disclosure, the molar ratio between component (G) and component (E) is from 1:2 to 2:1. According to another embodiment of the present disclosure, the weight ratio between component (D) and the total weight of the components (A), (B), (E) and (F) is from 1:100 to 3:10. According to another embodiment of the present disclosure, the weight ratio between component (C) and the total weight of the components (A), (B), (E) and (F) is from 1:50 to 1:10.

In a second aspect of the present disclosure, the present disclosure provides a synthetic leather article, comprising, from top to bottom: a polyurethane skin film derived from the internally emulsified polyurethane dispersion of the present disclosure; a middle foam layer; and a bottom fabric layer.

In a second aspect of the present disclosure, the present disclosure provides a method for preparing the internally emulsified polyurethane dispersion of the present disclosure, comprising (i) reacting component (A) with component (B) and component (E) in the presence of component (F) to form a PUD prepolymer;

(ii) neutralizing the PUD prepolymer with component (G); and (iii) combining the neutralized PUD prepolymer with component (C), (D), and (H) to form the internally emulsified polyurethane dispersion.

It is to be understood that both the foregoing general description and the following detailed description are exemplary and explanatory only and are not restrictive of the invention, as claimed.

BRIEF DESCRIPTION OF THE DRAWINGS

FIG. 1 is a schematic illustration of a cross-section of one embodiment of a synthetic leather laminate structure described herein.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated.

In an embodiment of the present disclosure, the polyurethane dispersion is prepared by a first step: reacting component (A), component (B) and component (E) in the presence of component (F) to form a PUD prepolymer; a second step: neutralizing the PUD prepolymer with component (G); and a third step: combining the neutralized PUD prepolymer with component (C), (D), and (H) to form the internally emulsified polyurethane dispersion. As used herein, the term "PUD prepolymer" refers to a prepolyemr of PU which has not been blended with the components (C), (D) and (H) in the third step.

As used herein, the term "internally emulsified" or "internal emulsification" refers to a mechanism in which the emulsification function is substantially or completely contributed by the component (E) which has been covalently integrated within the polyurethane main chain. Particularly, in the first step as stated above, the isocyanate-reactive groups of component (B) and hydroxyl groups of component (E) react with the isocyanate groups of component (A) to form polyurethane main chain in which carboxylic acid group is present as pendant group covalently attached to the copolymerization units derived from component (E), thus exhibiting an "internal emulsification" effect to the polyurethane dispersion. The carboxylic acid pendant group can be in the form of carboxylic acid group, anionic carboxylate salt group, non-ionic carboxylate ester group, or a combination thereof. For example, the pH value of the polyurethane dispersion can be properly adjusted according to the actual requirements so that part of the carboxylic acid pendant group is in the form of carboxylic acid group, while the rest can be anionic carboxylate salt group or non-ionic carboxylate ester group.

As used herein, the term "externally emulsified" or "external emulsification" refers to a different mechanism in which the component exhibiting the emulsification function is not covalently attached to the polyurethane main chain (i.e. external emulsifier/surfactant). According to a preferable embodiment of the present disclosure, the polyurethane dispersion of the present disclosure is completely internally emulsified. In other words, no external emulsifier/surfactant is added before, during and after the formation of the polyurethane dispersion.

According to one embodiment of the present disclosure, the polyurethane formed in the first step comprises at least one free isocyanate group, such as one or two free isocyanate group, in each polymerized main chain, and is referred as a "PUD prepolymer" which may further react with component (C) and component (D) in the third step to produce the polyurethane dispersion of the present disclosure. According to one preferable embodiment of the present disclosure, the PUD prepolymer formed in the first stage has an isocyanate groups contents (NCO %) of from 1 to 20 wt %, such as from 3 to 15 wt %, preferably larger than 3.0 wt %, more preferably larger than 4 wt %, such as about 4.5 wt % to 5.0 wt %.

In the third step, the free isocyanate group contained in the PUD prepolymer reacts with the amine groups of component (C) and component (D), thus extending the PU main chain to form the polyurethane dispersion of the present disclosure.

According to one embodiment of the present disclosure, hazardous and/or flammable solvents like dimethylformamide (DMF), dimethylacetamide (DMAc), N-methyl pyrrolidone (NMP), acetone, etc. are not used during the preparation of the PUD. According to another embodiment of the present disclosure, the PUD of the present disclosure is free of any hazardous and/or flammable solvent. According to another embodiment of the present disclosure, the PUD may optionally comprise green organic solvent, i.e. an organic solvent which is environmentally friendly, with a content of 0-15 wt %, or from 2 wt % to 12 wt %, or from 3 wt % to 10 wt %, based on the total weight of the PUD.

The components for preparing the polyurethane dispersion are particularly introduced in the following paragraphs.

Component (A)

In various embodiments, the isocyanate compound of component (A) has an average functionality of at least about 2.0, such as from about 2 to 10, or from about 2 to about 8, or from about 2 to about 6. In some embodiments, component (A) includes a polyisocyanate compound comprising at least two isocyanate groups. In another embodiment of the present disclosure, the polyisocyanate compounds include aromatic, aliphatic, cycloaliphatic and araliphatic polyisocyanates having two or more isocyanate groups. In an embodiment of the present disclosure, the polyisocyanate compounds are selected from the group consisting of $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ araliphatic polyisocyanates comprising at least two isocyanate groups, and combinations thereof. In another embodiment of the present disclosure, the polyisocyanate compounds include m-phenylene diisocyanate, 2,4-toluene diisocyanate and/or 2,6-toluene diisocyanate (TDI), the various isomers of diphenylmethanediisocyanate (MDI), methylenebis(cyclohexyl isocyanate) (EIMDI), hexamethylene-1,6-diisocyanate (HDI), tetramethylene-1,4-diisocyanate, cyclohexane-1,4-diisocyanate, hexahydrotoluene diisocyanate, hydrogenated MDI, naphthylene-1,5-diisocyanate, isophorone diisocyanate (IPDI), or mixtures thereof.

According to another embodiment of the present disclosure, the isocyanate component can be modified multifunctional isocyanates, that is, products which are obtained through chemical reactions of the above isocyanates compounds. Exemplary are polyisocyanates containing esters, ureas, biurets, isocyanurates, allophanates and preferably carbodiimides and/or uretoneimines, such as 4,4'-carbodiimide modified MDI products. Liquid polyisocyanates containing carbodiimide groups, uretoneimines groups and/or isocyanurate rings, having isocyanate groups (NCO) contents of from 10 to 40 weight percent, such as from 20 to 35 weight percent, can also be used.

Alternatively or additionally, the polyisocyanate compound may comprise an isocyanate prepolymer with functionality in the range of 2 to 10, such as from 2 to 8, or from 2 to 6. The isocyanate prepolymer can be obtained by reacting the above stated monomeric isocyanate compound(s) with one or more isocyanate-reactive compounds selected from the group consisting of ethylene glycol, 1,2-propanediol, 1,3-propanediol, 1,3-butanediol, 1,4-butanediol, 1,4-butenediol, 1,4-butynediol, 1,5-pentanediol, neopentyl-glycol, bis(hydroxy-methyl) cyclohexanes such as 1,4-bis(hydroxymethyl)cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol and polybutylene glycols. Suitable prepolymers for use as the component (A) are prepolymers having NCO group contents of from 2 to 40 weight percent, such as from 4 to 30 weight percent. These isocyanate prepolymers can be prepared by reaction of the di-isocyanate compounds and/or poly-isocyanate compounds with materials including lower molecular weight diols and triols. Individual examples are cycloaliphatic or aromatic polyisocyanates containing urethane groups, preferably having NCO contents of from 2 to 40 weight percent, such as from 5 to 35 weight percent, obtained by reaction of diisocyanates and/or polyisocyanates with, for example, lower molecular weight diols, triols, oxyalkylene glycols, dioxyalkylene glycols, or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylene-polyoxyethylene glycols can be used. Polyester polyols can also be used, as well as alkane diols such as butane diol. Other diols also useful include bishydroxyethyl- or bishydroxypropyl-bisphenol A, cyclohexane dimethanol, and bishydroxyethyl hydroquinone.

Generally, the amount of the component (A) may vary based on the actual requirement of the synthetic leather article. For example, as one illustrative embodiment, the content of the component (A) can be from about 5 wt % to about 50 wt %, such as from about 10 wt % to about 40 wt %, or from about 15 wt % to about 30 wt %, or from about 20 wt % to about 25 wt %, based on the total weight of all the components for preparing the intermediate PU polymer in the first stage, i.e., based on the total weight of components (A), (B), (E) and (F).

Component (B)

In various embodiments of the present disclosure, the component (B) comprises one or more polyols selected from the group consisting of aliphatic polyhydric alcohols comprising at least two hydroxyl groups, cycloaliphatic or aromatic polyhydric alcohols comprising at least two hydroxyl groups, araliphatic polyhydric alcohols comprising at least two hydroxyl groups, polyether polyol, polyester polyol, vegetable oil having at least two hydroxyl groups and mixture thereof. For example, the polyol can be selected from the group consisting of C2-C16 aliphatic polyhydric alcohols comprising at least two hydroxyl groups, C6-C15 cycloaliphatic or aromatic polyhydric alcohols comprising at least two hydroxy groups, C7-C15 araliphatic polyhydric alcohols comprising at least two hydroxy groups, polyester polyols comprising at least two hydroxy groups and having a molecular weight from 100 to 5,000, polyether polyols comprising at least two hydroxy groups and having a molecular weight from 1,500 to 12,000, and combinations thereof.

In an embodiment of the present disclosure, the component (B) comprises a mixture of two or more different polyols, such as a mixture of two or more polyether polyols, a mixture of two or more polyester polyols, a mixture of at least one polyether polyol with at least one polyester polyol, a mixture of two or more vegetable oils having at least two hydroxyl groups, or a mixture of a polyether polyol and a polycarbonate polyol.

In an alternative embodiment, the component (B) is a polyether polyol having a functionality (average number of isocyanate-reactive groups, particularly, hydroxyl group, in a polyol molecule) of 2.0 to 3.0 and a weight average molecular weight (Mw) of 1,500 to 12,000 g/mol, such as from 2,000 to 8,000 g/mol, or from 2,000 to 6,000 g/mol. According to an embodiment of the present disclosure, the polyether polyol is selected from the group consisting of polytetrahydrofuran, poly(propylene glycol), and copolymer of ethylene epoxide and propylene epoxide with primary hydroxyl ended group and secondary hydroxyl end group. According to another embodiment of the present disclosure, the polyether polyol is polytetrahydrofuran (PTMEG) having a hydroxyl functionality of 2 and a weight average molecular weight (Mw) of about 2,000.

The polyether polyols is generally prepared by polymerization of one or more alkylene oxides selected from propylene oxide (PO), ethylene oxide (EO), butylene oxide, tetrahydrofuran and mixtures thereof, with proper starter molecules in the presence of catalyst. Typical starter molecules include compounds having at least 2, preferably from 4 to 8 hydroxyl groups or having two or more primary amine groups in the molecule. Suitable starter molecules are for example selected from the group comprising aniline, EDA, TDA, MDA and PMDA, more preferably from the group comprising TDA and PMDA, an most preferably TDA. When TDA is used, all isomers can be used alone or in any desired mixtures. For example, 2,4-TDA, 2,6-TDA, mixtures of 2,4-TDA and 2,6-TDA, 2,3-TDA, 3,4-TDA, mixtures of 3,4-TDA and 2,3-TDA, and also mixtures of all the above isomers can be used. By way of starter molecules having at least 2 and preferably from 2 to 8 hydroxyl groups in the molecule it is preferable to use trimethylolpropane, glycerol, pentaerythritol, castor oil, sugar compounds such as, for example, glucose, sorbitol, mannitol and sucrose, polyhydric phenols, resols, such as oligomeric condensation products of phenol and formaldehyde and Mannich condensates of phenols, formaldehyde and dialkanolamines, and also melamine. Catalyst for the preparation of polyether polyols may include alkaline catalysts, such as potassium hydroxide, for anionic polymerization or Lewis acid catalysts, such as boron trifluoride, for cationic polymerization. Suitable polymerization catalysts may include potassium hydroxide, cesium hydroxide, boron trifluoride, or a double cyanide complex (DMC) catalyst such as zinc hexacyanocobaltate or quaternary phosphazenium compound. In a preferable embodiment of the present disclosure, the polyether polyol includes (methoxy) polyethylene glycol (MPEG), polyethylene glycol (PEG), poly(propylene glycol) or copolymer of ethylene epoxide and propylene epoxide with primary hydroxyl ended group and secondary hydroxyl ended group.

In general, the content of component (B) used herein may range from about 25 wt % to about 85 wt %, or from about 45 wt % to about 85 wt %, or from about 55 wt % to about 76 wt %, or from about 65 wt % to about 75 wt %, based on the total weight of all the components for preparing the intermediate PU polymer in the first stage, i.e., based on the total weight of components (A), (B), (E) and (F).

Component (C)

The hydrophilic amino siloxane compound of component (C) is a compound comprising a silicon-oxygen back bone chain to which nitrogen—containing side chain and hydrophilic side chain are attached. The molecular structure of the hydrophilic amino siloxane compound may be represented by Formula I:

Formula I

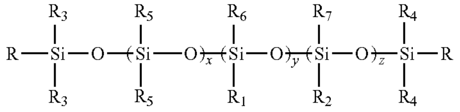

wherein each R independently represents methyl, ethyl, n-propyl, i-propyl, n-butyl, i-butyl, s-butyl, t-butyl, n-pentyl, i-pentyl, tert-pentyl, neo-pentyl, cyclohexyl, phenyl, tolyol, vinyl, allyl or $—(OCH_2CH_2)_a—O—CH_2—CH{=}CH_2$;

$R_1$ is $—(CH_2)_mNH_2$ or $—(CH_2)_s—NH—(CH_2)_tNH_2$;

$R_2$ is $—CH_2CH_2CH_2O(CH_2CH_2O)_nH$; and each of $R_3$, $R_4$, $R_5$, $R_6$ and $R_7$ is independently selected from the group consisting of methyl, ethyl, n-propyl, i-propyl, n-butyl, i-butyl, sec-butyl, t-butyl, n-pentyl, i-pentyl, tert-pentyl, neo-pentyl, cyclohexyl, phenyl and tolyol;

wherein a is an integer of 1 to 10, such as an integer of 1, 2, 3, 4, 5, 6, 7, 8, 9 or 10; x is an integer of 20-500, such as from 20 to 200, or from 50 to 150, or from 80 to 120, or from 90 to 100; y is an integer of 1-20, or from 1 to 10, such as an integer of 1, 2, 3, 4, 5, 6, 7, 8, 9, 10, 11, 12, 13, 14, 15, 16, 17, 18, 19 or 20; z is an integer of 1-20, or from 1 to 10, such as an integer of 1, 2, 3, 4, 5, 6, 7, 8, 9, 10, 11, 12, 13, 14, 15, 16, 17, 18, 19 or 20; m is an integer of 1-10, or from 1 to 5, such as an integer of 1, 2, 3, 4, 5, 6, 7, 8, 9 or 10; s is an integer of 1-10, or from 1 to 5, such as an integer of 1, 2, 3, 4, 5, 6, 7, 8, 9 or 10; t is an integer of 1-10, or from 1 to 5, such as an integer of 1, 2, 3, 4, 5, 6, 7, 8, 9 or 10; and n is an integer of 5-30, such as from 5 to 20, or from 10 to 15.

Without being limited to any specific theory, the amine group in $R_1$ and the hydroxyl group in $R_2$ may react with the remaining isocyanate group in the intermediate PU polymer to produce a polyurethane comprising the above siloxane structure in the polyurethane back bone chain, thus significantly improve the performance properties, such as anti-stickiness, of the resultant PU skin film.

According to one preferable embodiment of the present disclosure, the hydrophilic amino siloxane compound has a structure presented by Formula Ia:

Formula Ia

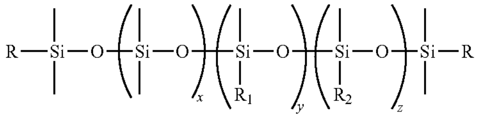

wherein R, $R_1$, $R_2$, x, y and z are as described above.

In general, the content of the hydrophilic amino siloxane compound used herein is from 2 wt % to 10 wt %, or from 2 wt % to 8 wt %, or from 3 wt % to 7 wt %, or from 4 wt % to 5 wt %, based on the total weight of all the components for preparing the intermediate PU polymer in the first stage, i.e., based on the total weight of components (A), (B), (E) and (F). It can be seen that the content of the hydrophilic amino siloxane compound is calculated as an additional amount while taking the total amount of the intermediate PU polymer as 100 wt %. According to an embodiment of the present disclosure, the hydrophilic amino siloxane compound should be firstly dissolved/dispersed in water via mixing to get an aqueous solution and then degassed, thus the above said content of hydrophilic amino siloxane compound is calculated based on the amount of the siloxane solute/dispersed phase instead of the solution/dispersion.

The hydrophilic amino siloxane compound was added during the second stage and was not incorporated into PU polymer backbone during the synthesis of the intermediate PU polymer. The reason is that some degree of polymeric gel will be formed if the siloxane was added during the first stage.

Component (D)

The component (D) is a polyetheramine compound represented by Formula II:

Formula II

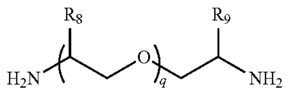

wherein each of $R_8$ and $R_9$ is independently selected from the group consisting of hydrogen, methyl, ethyl, n-propyl, i-propyl, n-butyl, i-butyl, sec-butyl, t-butyl, n-pentyl, i-pentyl, tert-pentyl, neo-pentyl, cyclohexyl, phenyl, tolyol, and a combination thereof, and q is an integer of 2 to 20. According to an embodiment of the present disclosure, q is an integer of 2, 3, 4, 5, 6, 7, 8, 9, 10, 11, 12, 13, 14, 15, 16, 17, 18, 19 or 20.

According to another embodiment of the present disclosure, the each of $R_8$ and $R_9$ is independently selected from the group consisting of hydrogen, methyl, and a combination thereof. As used herein, the expression of "a combination thereof" means that part of the $R_8/R_9$ is hydrogen, while the rest of $R_8/R_9$ can be methyl. Examples of the polyetheramine may include Jeffamine D-230, Jeffamine D-400, Jeffamine ED-600, Jeffamine D-2000, and any combinations thereof.

In general, the content of the polyetheramine compound used herein is from 1 wt % to 30 wt %, or from 5 wt % to 25 wt %, or from 10 wt % to 22 wt %, or from 11 wt % to 22 wt %, based on the total weight of all the components for preparing the PUD prepolymer in the first stage, i.e., based on the total weight of components (A), (B), (E) and (F). It can be seen that the content of the hydrophilic amino siloxane compound is calculated as an additional amount while taking the total amount of the PUD prepolymer as 100 wt %. According to an embodiment of the present disclosure, the polyetheramine compound is blended with the neutralized PUD prepolymer in the form of a solution, such as an aqueous solution, thus the above said content of polyetheramine compound is calculated based on the amount of the polyetheramine solute instead of the solution. According to one embodiment of the present disclosure, the molar ratio between the polyetheramine compound and the PUD prepolymer formed in the first stage is from 1:10 to 1:1, such as from 1:5 to 1:1, preferably from 4:5 to 1:1, more preferably 9:10.

According to one embodiment of the present disclosure, the polyetheramine compound has an amino functionality of about 2.0 to 3.0. According to another embodiment of the present disclosure, the polyetheramine compound has a weight average molecular weight of 200-2000 g/mol, or from 200 to 1000 g/mol, but is preferably has a Mw less than 600 g/mol more preferably from 200 to 500 g/mol or from 200 to 400 g/mol.

According to an embodiment of the present disclosure, no additional extending agent other than said component (C) and (D) is used. According to another embodiment of the present disclosure, the preparation of the PUD prepolymer and/or the PUD may further comprise some additional extending agent other than said component (C) and (D), and examples of said additional extending agent may include, e.g. propylenediamine (PDA), aminoethyethanolamine (AEEA), hexanediamine (HDA), and any combinations thereof. According to an embodiment of the present disclosure, the weight ratio between component (D) and the "additional extending agent" can be from 10:1 to 2:1, such as from 8:1 to 4:1, or from 6:1 to 5:1.

Component (E)

The Component (E) is a $C_2$-$C_{20}$ carboxylic acid compound having at least two hydroxyl groups, and examples of said component (E) is selected from the group consisting of dimethylol-formic acid, dimethylol-acetic acid, dimethylol-propionic acid, dimethylol-butanoic acid, dimethylol-pentanoic acid, dimethylol-hexanoic acid, dimethylol-heptanoic acid, dimethylol-nonanoic acid, dimethylol-capric acid, dimethylol-lauric acid, dimethylol-palmitic acid, dimethylol-stearic acid, dimethylol-cyclohexane carboxylic acid, dimethylol-benzoic acid, dihydroxy glutaric acid, tartaric acid, and any combinations thereof. The content of component (C) used herein is from 1 wt % to 10 wt %, or from 2 wt % to 5 wt %, or from 3 wt % to 4 wt %, based on the total weight of all the components for preparing the intermediate PU polymer in the first stage, i.e., based on the total weight of components (A), (B), (E) and (F).

Component (F)

Catalyst may include any substance that can promote the reaction between the isocyanate group and the isocyanate-reactive group. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof.

Tertiary amine catalysts include organic compounds that contain at least one tertiary nitrogen atom and are capable of catalyzing the hydroxyl/isocyanate reaction. The tertiary amine, morpholine derivative and piperazine derivative catalysts can include, by way of example and not limitation, triethylenediamine, tetramethylethylenediamine, pentamethyl-diethylene triamine, bis(2-dimethylaminoethyl)ether, triethylamine, tripropylamine, tributyl-amine, triamylamine, pyridine, quinoline, dimethylpiperazine, piperazine, N-ethylmorpholine, 2-methylpropanediamine, methyltriethylenediamine, 2,4,6-tridimethylamino-methyl)phenol, N,N',N"-tris(dimethyl amino-propyl)sym-hexahydro triazine, or mixtures thereof.

The content of the catalyst used herein is larger than zero and is at most 1.0 wt %, or at most 0.5 wt %, or at most 0.1 wt %, or at most 0.05 wt %, based on the total weight of all the components for preparing the intermediate PU polymer in the first stage, i.e., based on the total weight of components (A), (B), (E) and (F).

Component (G)

The neutralizer of component (G) may comprise an organic base, such as trimethylamine, triethylamine, tripropylamine, tributylamine, tripentylamine, trihexylamine, trimethanolamine, triethanolamine, and any combinations thereof. The molar ratio between component (G) and component (E) is from 1:2 to 2:1, such as from 7:10 to 1:1.

Component (H)

Water, such as deionized water, is added in the second stage. The content of water can be properly selected so that the polyurethane dispersion of the present disclosure has a high solids loading of polyurethane particles, such as at least 45 wt %, or higher than 45 wt %, or higher than 47 wt %, or higher than 48 wt %, or higher than 49 wt %, or at least 50 wt %, or higher than 50 wt %, and at most 70 wt %, or at most 65 wt %, or at most 60 wt %, or at most 55 wt %.

The polyurethane dispersion of the present disclosure may be heated and dried to form a skin film exhibiting superior improved anti-stickiness, wrinkle resistance and color fastness while maintaining good PUD film mechanical properties.

The waterborne polyurethane dispersion may optionally contain a rheological modifier such as thickeners that enhance the dispersability and stability of the dispersion. Any suitable rheological modifier may be used such as those known in the art. Preferably, the rheological modifier is one that does not cause the dispersion to become unstable. More preferably, the rheological modifier is a water soluble thickener that is not ionized. Examples of useful rheological modifiers include methyl cellulose ethers, alkali swellable thickeners (e.g., sodium or ammonium neutralized acrylic acid polymers), hydrophobically modified alkali swellable thickeners (e.g., hydrophobically modified acrylic acid copolymers) and associative thickeners (e.g., hydrophobically modified ethylene-oxide-based urethane block copolymers). Preferably the rheological modifier is a methylcellulose ether. The amount of thickener is from at least about 0.2% to about 5% by weight of the total weight of the waterborne polyurethane dispersion, preferably from about 0.5% to about 2% by weight. According to another embodiment of the present disclosure, no thickener/rheological modifier is added into the polyurethane dispersion.

Generally, the waterborne polyurethane dispersion has a viscosity from at least about 10 cp to at most about 10,000 cp, preferably, from at least about 20 cp to at most about 5000 cp, more preferably, from at least about 30 cp to at most about 3000 cp.

In an embodiment of the present disclosure, the dispersion of the PU particles in the waterborne polyurethane dispersion can be promoted by the internal emulsifier and high shear stirring action, wherein the shear force and stirring speed can be properly adjusted based on specific requirement.

According to one embodiment of the present disclosure, the waterborne polyurethane dispersion may further comprise one or more pigment, dyes and/or colorant, all of which are generally termed as "color masterbatch" in the present disclosure. For example, the color masterbatch may be added so as to impart a transparent or translucent film with a desired color. Examples of pigments dyes and/or colorants may include iron oxides, titanium oxide, carbon black and mixtures thereof. The amount of the pigment, dyes and/or colorant may be 0.1% to 15%, preferably 0.5-10%, more preferably 1% to 5% by weight, based on the total weight of the waterborne polyurethane dispersion. Additives like crosslinker (such as aziridine), slipping agent, fast-drying agent (such as propylene glycol), wetting agent and defoamer (such as organic silicone) are additional components in the PUD formulation for synthetic leather application. Hazardous and flammable solvents like dimethylformamide (DMF), dimethylacetamide (DMAc), N-methyl pyrrolidone (NMP) and acetone are not used during PUD preparation. Green solvents like dipropyleneglycol dimethyl ether (DMM) are optionally used to decrease the viscosity of the PUD in the first and/or stage.

The Laminated Synthetic Leather Article

FIG. 1 is a schematic illustration of a cross-section of one embodiment of the synthetic leather article described herein. In one embodiment of the present disclosure, the synthetic leather article comprises, from top to bottom, a skin film formed by the polyurethane dispersion of the present disclosure, a foam layer, and a bottom fabric layer (e.g. a textile fabric cloth). Please note that the leather article is not necessarily shown in actual proportion, and the dimensions of one or more layers may be exaggerated so as to clearly show the configuration thereof.

The foam layer can be formed by a 1K PU foam, a 2K PU foam, a mechanically frothed PUD foam, preferably a non-solvent PU foam and comprises a continuous PU matrix that defines a plurality of pores and/or cells therein.

According to an embodiment of the present disclosure, the laminate can be formed by applying the PU skin layer, the middle foam layer and the bottom fabric layer onto a release layer in sequence. Suitable release layers are typically known in the prior art as “release paper”. Examples of suitable release layers include foils of metal, plastic or paper. In one preferred embodiment of the present disclosure, the release layer is a paper layer optionally coated with a plastic membrane. Preferably, the paper layer disclosed herein is coated with a polyolefin, more preferably polypropylene. Alternatively, the paper layer is preferably coated with silicone. In an alternative embodiment, the release layer used herein is a PET layer optionally coated with plastic membrane. Preferably, the PET layer can be is coated with a polyolefin, more preferably polypropylene. Alternatively, the PET layer is preferably coated with silicone. Examples of suitable release layers are commercially available. The release layers used in the present disclosure may have a flat, embossed or patterned surface so that corresponding or complementary surface profile can be formed on the outermost surface of the synthetic leather article. Preferably, the release layer is textured in the mode of leather grain so as to impart the synthetic leather article with good haptic property comparable with that of high grade natural leather. The release layer generally has a thickness of 0.001 mm to 10 mm, preferably from 0.01 mm to 5 mm, and more preferably from 0.1 mm to 2 mm.

The material and the thickness of the release layer can be properly adjusted, as long as the release layer is able to endure the chemical reaction, mechanical processing and thermal treatments experienced during the manufacturing procedures and can be readily peeled from the resultant synthetic leather without bringing about the delamination between the skin film and the middle foam layer.

The PU skin film and the middle foam layer may independently and optionally comprise any additional auxiliary agents and/or additives for specific purposes.

In one embodiment of the present disclosure, one or more of the auxiliary agents and/or additives may be selected from the group consisting of fillers, cell regulators, release agents, colorants/pigments, surface-active compounds, handfeeling agents, dullers, thickeners, crosslinkers and stabilizers.

In an embodiment of the present disclosure, the bottom fabric layer has a thickness of in the range from 0.01 mm to 50 mm, preferably in the range from 0.05 mm to 10 mm and more particularly in the range from 0.1 mm to 5 mm. The bottom fabric layer may comprise one or more selected from the group consisting of fabric, preferably woven or nonwoven fabric, impregnated fabrics, knit fabric, braid fabric or microfiber; foil of metal or plastic, e.g. rubber, PVC or polyamides; and leather, preferably split leather.

The bottom fabric layer can be made of a woven or nonwoven textile. Preferably, the textile is a nonwoven textile. The textile may be made by any suitable method such as those known in the art. The textile may be prepared from any suitable fibrous material. Suitable fibrous materials include, but are not limited to, synthetic fibrous materials and natural or semi synthetic fibrous materials and mixtures or blends thereof. Examples of synthetic fibrous materials include polyesters, polyamides, acrylics, polyolefins, polyvinyl chlorides, polyvinylidene chlorides, polyvinyl alcohols and blends or mixtures thereof. Examples of natural semi-synthetic fibrous materials include cotton, wool and hemp.

Manufacture Technology

The polyurethane dispersion of the present disclosure may be applied by conventional coating technologies such as spraying coating, blade coating, die coating, cast coating, etc.

The skin film can be either partially or completely dried before the application of the next layer. Preferably, the skin film is completely dried so as to minimize the moisture entrapped therein, and then the next layer is applied thereon. In an alternative embodiment of the present application, only part of the moisture is removed from the skin film on the release layer, then the skin film is completely dried together with the foam layer applied thereon.

According to one embodiment, the middle foam layer may be formed by blending a mechanical frothing PU material (preferably an aqueous dispersion of PU, such as SCISKY KT-650 available from Scisky) with one or more processing aiding agents selected from the group consisting of surfactant, emulsifier, thickening agent, foaming agent, catalyst, dispersing agent, dispersing aid, foam stabilizer and filler under mechanical stirring, applying the blend onto the skin film, and heating the wet foam layer in an oven at a temperature of e.g. from 70° C. to 150° C., preferably from 90° C. to 130° C. for a short duration of 10 seconds to 20 minutes, preferably from 30 seconds to 15 minutes, more preferably from 1 to 10 minutes. After the first foam layer is dried, another foam layer with similar formulation and higher viscosity is coated on the first foam layer. Then without drying, the bottom fabric layer is applied to the foam layer with the assistance of a pressing roller, followed by being post cured at a higher temperature of e.g. from 100° C. to 160° C., preferably from 110° C. to 150° C. for a longer duration of 3 to 20 minutes, preferably from 3 to 15 minutes, more preferably from 4 to 10 minutes. The above stated two-step curing process aims to ensure high adhesion strength between the pre-cured foam layer and the fabric layer.

According to an embodiment of the present disclosure, the release layer is removed after the foam layer and the skin layer has been fully cured. The release layer can be peeled off via any ordinary technologies.

According to an embodiment of the present disclosure, after the removal of the release layer, a top finishing layer can be applied onto the surface of the synthetic leather (i.e. on the outermost surface of the skin film) and dried to form a protection film layer. The presence of the finishing layer can further increase abrasion resistance of the multilayer synthetic leather. The protection film layer may be formed by using any suitable raw materials and technologies. The finishing layer may optionally comprise additives such as wetting agent, crosslinking agent, binder, matting agent, hand-feel modifier, pigments and/or colorants, thickener or other additives used for the skin film. The synthetic leather disclosed herein can further comprise one or more than one optional additional layer such as a color layer between the skin film and the finishing layer. Other suitable optional additional layers can be selected from a water repellent layer, UV protective layer and tactile (touch/feel) modification layer. The process of the present invention may be carried out continuously or batchwise.

The multilayer structure synthetic leather disclosed herein can be cut or otherwise shaped so as to have a shape suitable for any desired purpose, such as shoe manufacturing. Depending on the intended application, the synthetic leathers can be further treated or post-treated similarly to natural leathers, for example by brushing, filling, milling or ironing. If desired, the synthetic leathers may (like natural leather) be finished with the customary finishing compositions. This provides further possibilities for controlling their character. The multilayer structure disclosed herein may be used in various applications particularly suitable for use as synthetic leather, for example, footwear, handbags, belts, purses, garments, furniture upholstery, automotive upholstery, and gloves. The multilayer structure is particular suitable for use in automotive applications.

EXAMPLES

Some embodiments of the invention will now be described in the following Examples, wherein all parts and percentages are by weight unless otherwise specified.

The information of the raw materials used in the examples is listed in the following table 1:

TABLE 1

Raw materials used in the following examples

| Raw Material | Description | Vendor |
|---|---|---|
| Isophorone diisocyanate (IPDI) | Aliphatic isocyanate, functionality = 2 | Evonik |
| Poly-tetrahydrofuran (PTMEG-2000) | Mw = 2000, Functionality = 2 | BASF |
| Dimethylolbutanoic acid (DMBA) | Dihydroxy-carboxylic acid | The Dow Chemical Company |
| Sodium dodecyl benzene sulfonate (SDBS) | Surfactant | Sinopharm |
| DABCO MB20 | Catalyst (organic bismuth) | Evonik |
| Dipropyleneglycol dimethyl ether (DMM) | Green solvent | The Dow Chemical Company |
| Triethylamine (TEA) | DMBA's neutralizer | Sinopharm. |
| Propylenediamine (PDA) | Amine chain extender | Sinopharm. |
| Aminoethyethanolamine (AEEA) | Amine chain extender | Sinopharm. |
| Hexanediamine (HDA) | Amine chain extender | Sinopharm. |
| Jeffamine D-230 | Amine chain extender, Mw = 230 | Huntsman |
| Jeffamine D-400 | Amine chain extender, Mw = 430 | Huntsman |
| Jeffamine ED-600 | Amine chain extender, Mw = 600 | Huntsman |
| XIAMETER OFX-7700 | Hydrophilic amino silicone compound | The Dow Chemical Company |
| Black 525 | Black color master batch | Jinju Leather |
| ACRYSOL RM-998 | Thickener for skin layer | The Dow Chemical Company |
| DOWSIL 210S | Silicone based slipping agent | The Dow Chemical Company |
| DOWSIL 8590 | Silicone based defoamer | The Dow Chemical Company |
| Trimethylolpropane tris(2-methyl-1-aziridinepropionate) | Aziridine crosslinker (CAS: 64265-57-2) | Jinju Leather |
| SCISKY KT-650 | PUD for foam layer | Scisky |
| ORTEGOL EP-P 112 | Surfactant for PUD frothing | Evonik |
| ACRYSOL 830 | Thickener for foam layer | The Dow Chemical Company |

In the following Inventive Examples (IE) 1-3 and Comparative Examples (CE) 1-8, internally emulsified polyurethane dispersions for the skin film were prepared.

Example 1

In the first stage, a PUD prepolymer I was prepared by the following procedures: 72 g PTMEG-2000 and 3 g DMBA were charged into a 500 ml three neck flask and dehydrated at 115° C. under 76 mmHg pressure for one hour, then the dehydrated polyol mixture was naturally cooled down to a temperature of 70° C. to 75° C. 25 g IPDI was poured into the dehydrated polyol mixture at the same temperature under the protection of nitrogen ($N_2$) flow and mechanical stirring, then 0.05 g catalyst DABCO MB20 was added into the flask. The reaction lasted at 70° C. to 75° C. for one hour, and then heated to 80-85° C. and continued to react at this temperature for 2.5 hours to obtain the PUD prepolymer I, which has a theoretical NCO % of 4.7 wt %.

In the second stage, a PUD was prepared by using the following procedures: 100 g of the PUD prepolymer I was added into a 500 ml three neck flask, cooled to about 60° C. and into which 1.74 g TEA was added for neutralization. 5 g DMM was added therein and further stirred for 15 min. The mixture was transferred into a 500 ml plastic cup, to which 75.9 g ice/water blend was added, and then stirred with a Cowles mixer under a stirring speed of about 3000 rpm for 8 min, after which an emulsion was formed and the stirring speed was decreased to about 2000 rpm. 29 g Jeffamine D-230 (40 wt % aqueous solution) and 25 g OFX-7700 amino siloxane (20 wt % aqueous solution) were poured together into the emulsion. Finally, a polyurethane dispersion was obtained after filtration and stored in a plastic container with cover. The PUD prepared in Example 1 has a solid content of 50 wt %.

Example 2

In the first stage, a PUD prepolymer I was prepared by following the corresponding procedures of claim 1.

In the second stage, a PUD was prepared by using the following procedures: 100 g of the PUD prepolymer I was added into a 500 ml three neck flask, cooled to about 60° C. and into which 1.74 g IEA was added neutralization. 5 g DMM was added therein and further stirred for 15 min. The mixture was transferred into a 500 ml plastic cup, to which 70.9 g ice/water blend was added, and then stirred with a Cowles mixer under a stirring speed of about 3000 rpm for 8 min, after which an emulsion was formed and the stirring speed was decreased to about 2000 rpm. 54 g Jeffamine D-400 (40 wt % aqueous solution) and 25 g OFX-7700 amino siloxane (20 wt % aqueous solution) were poured together into the emulsion. Finally, a polyurethane dispersion was obtained after filtration and stored in a plastic container with cover. The PUD prepared in Example 2 has a solid content of 50 wt %.

Example 3

In the first stage, a PUD prepolymer was prepared by following the corresponding procedures of claim 1.

In the second stage, a PUD was prepared by using the following procedures: 100 g of the PUD prepolymer I was added into a 500 ml three neck flask, cooled to about 60° C. and into which 1.74 g TEA was added neutralization. 5 g DMM was added therein and further stirred for 15 min. The mixture was transferred into a 500 ml plastic cup, to which 70.75 g ice/water blend was added, and then stirred with a Cowles mixer under a stirring speed of about 3000 rpm for 8 min, after which an emulsion was formed and the stirring speed was decreased to about 2000 rpm. 27 g Jeffamine D-400 (40 wt % aqueous solution), 25 g OFX-7700 amino siloxane (20 wt % aqueous solution) and 9.3 g PDA (20 wt % aqueous solution) were poured together into the emulsion. Finally, a polyurethane dispersion was obtained after filtration and stored in a plastic container with cover. The PUD prepared in Example 3 has a solid content of 50 wt %.

Comparative Examples 1-6

Comparative Examples 1-4 and 6 were conducted by basically following the above stated procedures of Example 1, except that the formulations were changed based on the following Table 2, with the amounts of all the components represented in grams.

Comparative Example 5 was conducted by the following procedures: in the first stage, 76 g PTMEG-2000 and 3 g DMBA were charged into a 500 ml three neck flask and dehydrated at 115° C. under 76 mmHg pressure for one hour, then the dehydrated polyol mixture was naturally cooled down to a temperature of 70° C. to 75° C. 21 g IPDI was poured into the dehydrated polyol mixture at the same temperature under the protection of nitrogen ($N_2$) flow and mechanical stirring, then 0.05 g catalyst DABCO MB20 was added into the flask. The reaction lasted at 70° C. to 75° C. for one hour, and then heated to 80-85° C. and continued to react at this temperature for 2.5 hours to obtain a PUD prepolymer II, which has a theoretical NCO % of 3.0 wt %.

In the second stage, a PUD was prepared by using the following procedures: 100 g of the PUD prepolymer II was added into a 500 ml three neck flask, cooled to about 60° C. and into which 1.74 g TEA was added neutralization. 10 g DMM was added therein and further stirred for 15 min. The mixture was transferred into a 500 ml plastic cup, to which 93.8 g ice/water blend was added, and then stirred with a Cowles mixer under a stirring speed of about 3000 rpm for 8 min, after which an emulsion was formed and the stirring speed was decreased to about 2000 rpm. 11.9 g PDA (20 wt % aqueous solution) and 25 g OFX-7700 amino siloxane (20 wt % aqueous solution) were poured together into the emulsion. Finally, a polyurethane dispersion was obtained after filtration and stored in a plastic container with cover. The PUD prepared in Comparative Example 5 has a solid content of 45 wt %.

TABLE 2

Formulations of inventive examples (IE) and comparative examples (CE)

| | CE1 | CE2 | CE3 | CE4 | CE5 | CE6 | IE1 | IE2 | IE3 |
|---|---|---|---|---|---|---|---|---|---|
| PUD prepolymer I | 100 | 100 | 100 | 100 | | 100 | 100 | 100 | 100 |
| PUD prepolymer II | | | | | 100 | | | | |
| TEA | 1.74 | 1.74 | 1.74 | 1.74 | 1.74 | 1.74 | 1.74 | 1.74 | 1.74 |
| DMM | 5 | 5 | 5 | 5 | 10 | 5 | 5 | 5 | 5 |
| Ice/water | 70.6 | 66.0 | 64.2 | 90.9 | 93.8 | 66.6 | 75.9 | 70.9 | 70.75 |
| OFX-7700 (20% aq.) | 25 | 25 | 25 | 0 | 25 | 25 | 25 | 25 | 25 |
| PDA (20% aq.) | 18.6 | | | | 11.9 | | | | 9.3 |
| AEEA (20% aq.) | | 26.2 | | | | | | | |
| HDA (20% aq.) | | | 29.2 | | | | | | |
| Jeffamine D-230 (40% aq.) | | | | 29 | | | 29 | | |
| Jeffamine D-400 (40% aq.) | | | | | | | | 54 | 27 |
| Jeffamine ED-600 (40% aq.) | | | | | | 75.6 | | | |

Preparation of the PUD Skin Film 22.5 gram of the polyurethane dispersion prepared in each of the above said Inventive Examples 1-3 and Comparative Examples 1-8 was separately weighed and diluted with equal amount of deionized water. The diluted PUD was transferred into a vacuum oven and degassed for ~10 minutes. Then the degassed PUD was poured into a plastic surface petri dish. The dish filled with PUD was transferred into an oven and heated at 54° C. for 24 hours, after which the film was peeled from the dish, reversed and continuously dried for another 24 hours. The film was cooled down to room temperature for testing.

Fabrication of the Synthetic Leather Article

The waterborne polyurethane dispersion prepared in each of the above said Inventive Examples 1-3 and Comparative Examples 1-6 was separately mixed with color master batch, crosslinker, thickener, slipping agent and deformer as shown in table 3 at high speed (3000 rpm) for several minutes. The formulated PUD was coated on a release paper to a wet film thickness of 100 μm. The coated release paper was dried in oven at 90° C. for 2 min and then at 110° C. for 8 min. The release paper with dried PU skin layer was taken out of the oven and cooled down to ambient temperature. The PUD foam layer with 250% foaming ratio by mechanical frothing (see Table 4) was coated on the dried PU skin film on the release paper to a wet film thickness of 400 μm. The release paper with the PU skin film and the coated foam layer was transferred into a 130° C. oven and pre-cured for 10 min. The PU foam layer was then coated again on the coated release paper with the same scraper, carefully place the fabric cloth onto the wet foam layer and pressed with a 3.5 kg roller for 2 times. The leather specimen was put into a 130° C. oven and post-cured for 10 min and then taken out and cooled down.

TABLE 3

The formulation for the skin layer

| Material | Dosage (phr) |
|---|---|
| PUD | 50 |
| Black 525 | 2.5 |
| Trimethylolpropane tris(2-methyl-1-aziridinepropionate) | 0.4 |
| ACRYSOL RM-998 | 0.12 |
| DOWSIL ™ 210S | 2 |
| DOWSIL ™ 8590 | 0.1 |
| Total | 55.12 |

TABLE 4

The formulation for the middle foam layer

| Material | Dosage (phr) |
|---|---|
| SCISKY ™ KT-650 | 100 |
| ORTEGOL ® EP-P 112 | 4 |
| ACRYSOL 830 | 2 |
| Total | 106 |

Technologies for Characterizing the Products (a) Mechanical Properties of the PUD Skin Film The tensile strength, elongation at break, modulus at 100% elongation and tear strength of the PUD skin films obtained in Example 4 were characterized according to the standard ASTM D412-15a. Higher values of elongation at break and tensile strength represent better performance properties.

(b) Wrinkle Resistance Test of Synthetic Leather Article

The wrinkle resistance of synthetic leather was tested according to a method customized based on the standard ISO-105212. In particular, a 100 mm×50 mm synthetic leather sample was double folded to 50 mm×25 mm with skin layer faced together and treated in an oven at conditions of 70° C. and 95% relative humidity under 5 kg pressure for 2 h. The leather sample was then unfolded and recovered by steam iron for 5 min. The wrinkle resistance was judged according to the residue of horizontal and vertical wrinkles.

Passed: no vertical wrinkles & no apparent horizontal wrinkles;

Failed: apparent vertical wrinkles or apparent horizontal wrinkles.

(c) Anti-Stickiness Performance Property of Synthetic Leather Article

The anti-stickiness of the synthetic leather articles was characterized according to the standard GB/T 8948-2008. In particular, two 90 mm×60 mm samples of the synthetic leather article were pasted together face to face under a pressure of 1 kg and heated in an oven at 80° C. for 3 h. The anti-stickiness was judged according to the degree of stickiness between the two samples during detaching of the two samples at room temperature:

Passed: completely not sticky or can be detached with a little force;

Failed: cannot be detached or can be only detached with a large force or surface is damaged.

(d) Wet Color Fastness Test of Synthetic Leather

The wet color fastness of synthetic leather was tested according to the standard: ISO-11640. The soaked wet white wool felt (15 mm×15 mm) was loaded at the end of the friction head of the measuring instrument. The wool felt rub back and forth on the leather sample (120 mm×40 mm) with a load of 1 kg (one friction distance is 37 mm). The wet color fastness was evaluated according to the color change of the white wool felt after 100 cycles' friction.

Passed: The color did not changed after 50 cycles' friction.

Failed: The color changed after 50 cycles' friction.

(e) Softness or Hand-Feeling Test of Synthetic Leather

The result (Pass or Failed) was judged according to experienced leather expert's tactile sensation.

The performance properties of the skin films and synthetic leather articles prepared by using the PUD of all the inventive examples (IE) and comparative examples (CE) were summarized in Table 5. The performance of CE6 is not shown because the PUD was gelled after the degassing process.

TABLE 5 performance properties of the skin films and synthetic leather articles

| | Performance Criteria | CE1 | CE2 | CE3 | CE4 | CE5 | IE1 | IE2 | IE3 |
|---|---|---|---|---|---|---|---|---|---|
| PUD property | | | | | | | | | |
| Solid content | ≥50% | 50% | 50% | 50% | 50% | 45% | 50% | 50% | 50% |
| Skin film properties | | | | | | | | | |
| Tensile strength (MPa) | NA | 39.5 | 44.0 | 41.3 | 49.2 | 36.0 | 53.2 | 12.0 | 27.8 |
| Elongation (%) | NA | 610 | 646 | 613 | 917 | 744 | 942 | 1250 | 883 |

TABLE 5-continued

| performance properties of the skin films and synthetic leather articles | | | | | | | | | |
|---|---|---|---|---|---|---|---|---|---|
| | Performance Criteria | CE1 | CE2 | CE3 | CE4 | CE5 | IE1 | IE2 | IE3 |
| Modulus at 100% Elongation (MPa) | NA | 5.9 | 5.0 | 5.8 | 3.2 | 3.1 | 3.4 | 1.0 | 2.2 |
| Synthetic Leather properties | | | | | | | | | |
| Wrinkle resistance | Pass | Pass | Pass | Pass | Failed | Failed | Pass | Pass | Pass |
| Anti-stickiness | Pass | Pass | Pass | Pass | Failed | Failed | Pass | Pass | Pass |
| Color fastness | Pass | Pass | Pass | Pass | Failed | Pass | Pass | Pass | Pass |
| Softness or hand-feeling | Pass | Failed | Failed | Failed | Pass | Pass | Pass | Pass | Pass |

The comparison between inventive examples 1-3 and comparative examples 1-5 shows that the particularly defined combination of polyetheramine diamine and hydrophilic amino siloxane for internally emulsified PUD can achieve superior wrinkle resistance, anti-stickiness, color fastness and hand-feeling while retaining good mechanical properties, while none of the comparative examples, which do not comprise the above said combination, can achieve such superior performance properties.

Besides, all of the inventive examples can achieve a high solid content of ≥50 wt %, while comparative example 5 cannot achieve such a high solid content due to excessively high viscosity of the PUD prepolymer.

What is claimed is:

1. An internally emulsified polyurethane dispersion comprising polyurethane particles dispersed in water, wherein the polyurethane dispersion is derived from starting materials comprising:

Component (A): one or more compounds having at least two isocyanate groups;

Component (B): one or more compounds having at least two isocyanate-reactive groups;

Component (C): a hydrophilic amino siloxane compound represented by Formula I:

Formula I

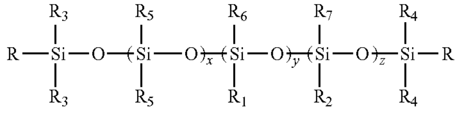

wherein each R independently represents methyl, ethyl, n-propyl, i-propyl, n-butyl, i-butyl, sec-butyl, t-butyl, n-pentyl, i-pentyl, tert-pentyl, neo-pentyl, cyclohexyl, phenyl, tolyl, vinyl, allyl or —(OCH2CH2)a-O—CH2-CH═CH2;

R1 is —(CH2)mNH2 or —(CH2)s-NH—(CH2)tNH2;

R2 is —CH2CH2CH2O(CH2CH2O)nH; and each of R3, R4, R5, R6 and R7 is independently selected from the group consisting of methyl, ethyl, n-propyl, i-propyl, n-butyl, i-butyl, sec-butyl, t-butyl, n-pentyl, i-pentyl, tert-pentyl, neo-pentyl, cyclohexyl, phenyl and tolyl;

wherein a is an integer of 1 to 10; x is an integer of 20-500; y is an integer of 1-20; z is an integer of 1-20; m is an integer of 1-10; s is an integer of 1-10; t is an integer of 1-10; and n is an integer of 5-30;

Component (D): a polyetheramine compound represented by Formula II:

Formula II

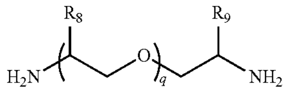

wherein each of R8 and R9 is independently selected from the group consisting of hydrogen, methyl, ethyl, n-propyl, i-propyl, n-butyl, i-butyl, sec-butyl, t-butyl, n-pentyl, i-pentyl, tert-pentyl, neo-pentyl, cyclohexyl, phenyl, tolyol, and combinations thereof, and q is an integer of 2 to 20;

Component (E): a C2-C20 carboxylic acid compound having at least two hydroxyl groups;

Component (F) a catalyst;

Component (G) a neutralizer; and

Component (H) water, wherein:

the content of component (A) is from 5 to 50% by weight, based on the total weight of the components (A), (B), (E) and (F);

the content of component (B) is from 25 to 85% by weight, based on the total weight of the components (A), (B), (E) and (F);

the content of component (E) is from 1 to 10% by weight, based on the total weight of the components (A), (B), (E) and (F);

the content of component (F) is up to 1% by weight, based on the total weight of the components (A), (B), (E) and (F);

the molar ratio between component (G) and component (E) is from 1:2 to 2:1;

the weight ratio between component (D) and the total weight of the components (A), (B), (E) and (F) is from 1:100 to 3:10; and the weight ratio between component (C) and the total weight of the components (A), (B), (E) and (F) is from 1:50 to 1:10.

2. The internally emulsified polyurethane dispersion according to claim 1, wherein the polyurethane dispersion does not comprise external emulsifier.

3. The internally emulsified polyurethane dispersion according to claim 1, wherein the polyurethane dispersion has a solid content higher than 45% by weight, based on the total weight of the polyurethane dispersion.

4. The internally emulsified polyurethane dispersion according to claim 1, wherein the one or more compounds having at least two isocyanate groups are selected from the group consisting of:

a) C4-C12 aliphatic polyisocyanates comprising at least two isocyanate groups, C6-C15 cycloaliphatic or aromatic polyisocyanates comprising at least two isocyanate groups, C7-C15 araliphatic polyisocyanates comprising at least two isocyanate groups, and a combination thereof;

b) modified multifunctional isocyanates derived from one or more polyisocyanates of a), wherein the modified multifunctional isocyanates comprises at least one functional group selected from the group consisting of ester group, urea group, biuret group, isocyanurate group, allophanate group, carbodiimide group, uretoneimine group, and a combination thereof; and c) an isocyanate prepolymer prepared by reacting one or more polyisocyanates of a) with one or more isocyanate-reactive compounds selected from the group consisting of C2-C16 aliphatic polyhydric alcohols comprising at least two hydroxyl groups, C6-C15 cycloaliphatic or aromatic polyhydric alcohols comprising at least two hydroxyl groups, C7-C15 araliphatic polyhydric alcohols comprising at least two hydroxyl groups, polyester polyols having a molecular weight from 500 to 5,000, polycarbonate diols having a molecular weight from 200 to 5,000, polyether polyols having a molecular weight from 200 to 5,000, C2 to C10 polyamine comprising at least two amino groups, C2 to C10 polythiol comprising at least two thiol groups, C2-C10 alkanolamine comprising at least one hydroxyl group and at least one amino groups, and a combination thereof, with the proviso that the isocyanate prepolymer comprises at least two free isocyanate terminal groups.

5. The internally emulsified polyurethane dispersion according to claim 1, wherein the one or more compounds having at least two isocyanate-reactive groups are selected from the group consisting of: C2-C16 aliphatic polyhydric alcohols comprising at least two hydroxyl groups, C6-C15 cycloaliphatic or aromatic polyhydric alcohols comprising at least two hydroxyl groups, C7-C15 araliphatic polyhydric alcohols comprising at least two hydroxyl groups, polyester polyols having a molecular weight from 500 to 5,000, polycarbonate diols having a molecular weight from 200 to 5,000, polyether polyols having a molecular weight from 200 to 5,000, C2 to C10 polyamine comprising at least two amino groups, C2 to C10 polythiol comprising at least two thiol groups, C2-C10 alkanolamine comprising at least one hydroxyl group and at least one amino groups, vegetable oil having at least two hydroxyl groups, and a combination thereof.

6. The internally emulsified polyurethane dispersion according to claim 1, wherein the C2-C20 carboxylic acid compound having at least two hydroxyl groups is selected from the group consisting of dimethylol-formic acid, dimethylol-acetic acid, dimethylol-propionic acid, dimethylol-butanoic acid, dimethylol-pentanoic acid, dimethylol-hexanoic acid, dimethylol-heptanoic acid, dimethylol-nonanoic acid, dimethylol-capric acid, dimethylol-lauric acid, dimethylol-palmitic acid, dimethylol-stearic acid, dimethylol-cyclohexane carboxylic acid, dimethylol-benzoic acid, dihydroxy glutaric acid, tartaric acid, and any combinations thereof.

7. The internally emulsified polyurethane dispersion according to claim 1, wherein the catalyst is selected from the group consisting of: organic tin, organic bismuth, tertiary amine, morpholine derivative, piperazine derivative, and combination thereof.

8. A synthetic leather article, comprising, from top to bottom:

a polyurethane skin film derived from the internally emulsified polyurethane dispersion according to claim 1;

a middle foam layer; and a bottom fabric layer.

9. A method for preparing the internally emulsified polyurethane dispersion according to claim 1, comprising (i) reacting component (A) with component (B) and component (E) in the presence of component (F) to form a PUD prepolymer; and (ii) neutralizing the PUD prepolymer with component (G); and (iii) combining the neutralized PUD prepolymer with component (C), (D), and (H) to form the internally emulsified polyurethane dispersion.

* * * * *